United States Patent
Cornwall

[19]

[11] Patent Number: 6,161,564
[45] Date of Patent: Dec. 19, 2000

[54] FIRE TRANSMISSION PREVENTION SYSTEM

[76] Inventor: Kenneth R. Cornwall, 1020 Vintage Club Dr., Duluth, Ga. 30097

[21] Appl. No.: 09/286,724

[22] Filed: Apr. 6, 1999

[51] Int. Cl.[7] .................................................. F16K 17/38
[52] U.S. Cl. ................................ 137/75; 137/74; 137/79; 137/1
[58] Field of Search .................................. 137/72, 74, 75, 137/79, 526, 1; 251/4

[56] References Cited

U.S. PATENT DOCUMENTS

| | | |
|---|---|---|
| Re. 35,532 | 6/1997 | Duren . |
| 2,928,413 | 3/1960 | Hansen . |
| 3,605,132 | 9/1971 | Lineback . |
| 3,815,629 | 6/1974 | Oberholtzer . |
| 3,923,081 | 12/1975 | Persson . |
| 4,232,706 | 11/1980 | Ericson . |
| 4,261,598 | 4/1981 | Cornwall . |
| 4,436,107 | 3/1984 | Persson . |
| 4,535,807 | 8/1985 | Ericson . |
| 4,545,398 | 10/1985 | van Olst . |
| 4,556,084 | 12/1985 | Frawley . |
| 4,583,565 | 4/1986 | Cornwall . |
| 4,623,170 | 11/1986 | Cornwall . |
| 4,638,829 | 1/1987 | Cornwall . |
| 4,643,221 | 2/1987 | Parker . |
| 4,712,574 | 12/1987 | Perrott . |
| 4,724,858 | 2/1988 | Cornwall . |
| 4,839,927 | 6/1989 | Watanabe ...................................... 4/211 |
| 4,867,802 | 9/1989 | Earl . |
| 4,953,235 | 9/1990 | Cornwall ................................. 137/362 |
| 4,962,548 | 10/1990 | van Deventer et al. . |
| 4,974,632 | 12/1990 | Ericson . |
| 5,035,097 | 7/1991 | Cornwall . |
| 5,040,351 | 8/1991 | Cornwall . |
| 5,048,562 | 9/1991 | Frawley . |
| 5,076,309 | 12/1991 | Cornwall . |
| 5,117,860 | 6/1992 | Horner, Jr. . |
| 5,127,425 | 7/1992 | Cornwall . |
| 5,155,957 | 10/1992 | Robertson et al. ........................ 137/75 |
| 5,183,070 | 2/1993 | Cornwall . |
| 5,263,746 | 11/1993 | Cornwall . |
| 5,293,724 | 3/1994 | Cornwall . |

*Primary Examiner*—Gregory L. Huson
*Assistant Examiner*—Ramesh Krishnamurthy
*Attorney, Agent, or Firm*—Ian C. McLeod; Mary M. Moyne

[57] ABSTRACT

A fire transmission prevention system (10) for use in a drainage system (100) to prevent the transmission of smoke and fire through the drainage system. The system is intended to be used in drainage systems in multi-story structures. The system includes a firestop (16), couplings (14, 26 and 30) and an air vent (42). The firestop prevents fire and smoke from moving through the inner passageways (44D) of the pipes (12, 24, 28 and 72) of a drainage system by blocking the inner passageway of the pipes with a fire resistant plug (20). The couplings are mounted in the floor (102) of the structure and are constructed and secured in the floor such as to prevent fire and smoke from passing around the couplings between the couplings and the floor. The air vent is provided in a vent pipe (40) of the system above a trap (38 or 78) of the system. The vent acts to prevent ambient air and thus, oxygen from entering the inner passageway of the pipes of a system when positive pressure, such as that caused by high temperature and fire, is present in the inner passageway of the pipes.

22 Claims, 6 Drawing Sheets

FIRE TRANSMISSION PREVENTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

(1) Field of the Invention

The present invention relates to a fire transmission prevention system which prevents the spread of smoke and fire from floor to floor in a structure through the branch drainage system. In particular, the present invention relates to a fire transmission prevention system which has a firestop coupling positioned between the floors in the drainage system and an air vent positioned in the branch drainage system above the highest trap in the branch drainage system.

(2) Description of the Related Art

To function properly, a branch drainage system must be provided with an air intake such as an air admittance valve or vent to prevent the formation of a vacuum in the drainage pipes. If the vacuum is formed and becomes too large, the water in the traps would be drawn out of the traps, whereafter, the sewer gas would be able to move up through the pipes to the surrounding rooms.

The related art has shown various types of air admittance valves for use on a stack pipe of a drainage system. The valves act to close off the pipe when there is at least atmospheric pressure in the pipe and to open up the pipe to admit air to the pipe to equalize the pressure in the pipe upon the occurrence of less-than-atmospheric pressure. Illustrative are U.S. Pat. Nos. Re. 35,532 to Duren; 3,605,132 to Lineback; 3,923,081 to Persson; 4,232,706 to Ericson; 4,436,107 to Persson; 4,535,807 to Ericson; 4,545,398 to van Olst; 4,556,084 to Frawley; 4,867,802 to Earl; 4,962,548 to van Deventer et al; 4,974,632 to Ericson and 5,048,562 to Frawley.

Also of some interest are U.S. Pat. Nos. 2,928,413 to Hansen; 3,815,629 to Oberholtzer and 4,712,574 to Perrott. Hansen describes a valve for relieving internal pressures and vacuums that tend to occur in storage tanks. Oberholtzer describes a sewer valve which prevents the backing up of water in plugged sewer lines by releasing the backed up sewage water to outside the structure without venting sewer gases to the atmosphere. Perrott describes a vacuum breaking valve for use in pressurized fluid supply lines to prevent back siphoning or flow reversal whenever an operational variant causes a vacuum to be produced in the supply system.

Only of minimal interest are U.S. Pat. Nos. 4,643,221 to Parker and 5,117,860 to Horner, Jr. which describe vacuum check valves for use in a vacuum supply line as a control for a vacuum suspended brake booster supply.

The related art has also shown various types of firestops to prevent the spread of smoke and fire through the pipes of a waste or drainage system. Illustrative are my U.S. Pat. Nos. 4,583,565; 4,638,829 and 4,724,858 which describe firestop fittings particularly adapted to prevent the spread of smoke and fire between floors in a multi-story structure by plugging off any potential fire path through a vertical pipe mounted between the floors. These patents describe an assembly where a non-flammable plug is released by heat less than required for heat destruction of a plastic coupling mounted in a floor. Upon being released, the plug moves into and seals an iron fitting mounted inside of the plastic coupling to serve as a non-flammable barrier through the iron fitting. This retards the spread of fire through the plastic coupling by depriving the inside of the coupling of oxygen.

In addition, my U.S. Pat. No. 5,183,070 describes a similar firestop fitting having a movable plug for plugging off a vertical pipe mounted between fire rated floor members. Further, my U.S. Pat. No. 5,127,425 describes a firestop fitting having a movable plug for plugging off a horizontal pipe mounted between vertical, fire rated wall members. Both of these inventions are particularly adapted to prevent the spread of smoke and fire through the pipe of a drainage system by plugging off the inside of the pipe.

The art also shows couplings which prevent the spread of smoke between floors; particularly, concrete floors. Illustrative are my U.S. Pat. Nos. 4,261,598; 4,623,170; 5,035,097; 5,040,351 and 5,293,724 which show couplings for mounting in partitions such as concrete floors or walls which are mounted to prevent smoke from moving between the couplings and the partition.

There remains the need for a fire transmission prevention system which uses an assortment of firestop, air vents and couplings mounted in a branch drainage system to prevent the transmission of fire and smoke from floor to floor in a structure by way of the drainage system.

SUMMARY OF THE INVENTION

The present invention is a fire transmission prevention system which prevents the transmission of smoke and fire through the inner passageways of the pipes and around the couplings of a drainage system. The system is for use in the drainage system in a multi-story structure. The system uses a combination of different elements which by themselves act to reduce the transmission of fire and smoke and which together provide an effective combination to stop the transmission of fire. The elements are used throughout a drainage system to provide complete prevention of transmission throughout the entire drainage system. The system includes at least a firestop, a coupling and an air vent. Fire resistant couplings are preferably used whenever the drainage system extends through a floor. The couplings are constructed such that once securely mounted in the floor, fire and smoke are unable to pass around the outside of the couplings between the couplings and the surrounding floor. The firestop prevents the spread of fire through the inner passageways of the pipes by blocking a pipe using a plug which will not melt. The pipe is preferably blocked at floor level directly adjacent the top of the coupling. The air vent assists the firestop to prevent the spread of smoke and fire through the inner passageways of the pipes. The air vent closes upon the occurrence of positive pressure in the inner passageways of the pipes. The closing of the air vent prevents ambient air and oxygen from entering the inner passageways of the pipes. Fire and high temperatures in the inner passageways of the pipes will cause a positive pressure in the pipes which will cause the vent to close. Without the air and oxygen, the fire will not spread.

The substance and advantages of the present invention will become increasingly apparent by reference to the following drawings and the description.

DESCRIPTION OF THE PREFERRED EMBODIMENT(S)

The present invention relates to a drainage system for a structure with a penetration through a floor, wherein the system prevents transmission of a fire and smoke through and above the floor, the improvement which comprises: a coupling having opposed ends and mounted through the penetration in the floor and secured to the floor to provide an airtight connection between the floor and the coupling; a first pipe section mounted in one of the ends of the coupling adjacent an underside of the floor and connected to an outlet pipe for the drainage system; a second pipe section mounted in the other one of the ends of the coupling adjacent a top side of the floor connected to a drain of a fixture, and having a first branch pipe trap between the coupling and the fixture for holding water, wherein the first branch pipe trap is at an elevation above all other branch pipe traps connected to the second pipe section; and an air vent mounted at a high point of the second pipe section between the coupling and the first branch pipe trap and mounted at least four inches above a weir water level of the first branch pipe trap, wherein the air vent opens and allows air into the drainage system when a negative pressure relative to atmospheric pressure is present in the system and automatically closes when there is a positive pressure relative to atmospheric pressure present in the system and wherein the system prevents fire transmission through the penetration and floor by automatic closing of the air vent.

Further, the present invention relates to a method for providing a drainage system in a structure with a penetration through a floor wherein the system prevents transmission of a fire and smoke through and above the floor, which comprises the steps of: mounting a coupling through the floor to provide an airtight connection between the coupling and the floor; mounting first and second pipe sections each having opposed ends in the coupling, wherein the first pipe section is mounted at one end in the coupling adjacent an underside of the floor and is connected at the other end to an outlet pipe for the drainage system and the second pipe section is mounted in the coupling adjacent a top side of the floor and is connected at the other end to a drain of a fixture, the second pipe section having a first branch pipe trap between the coupling and the fixture for holding water wherein the first branch pipe trap is at an elevation above all other branch pipe traps connected to the second pipe section; and mounting an air vent at a high point in the second pipe section above a weir water level of the first branch pipe trap, wherein the air vent allows air into the system when a negative pressure relative to atmospheric pressure is present in the system and automatically closes when there is a positive pressure relative to atmospheric pressure in the system and wherein the system prevents transmission of the fire through the penetration and floor by closing the air vent.

Still further, the present invention relates to an air vent for preventing air from entering an interior of first and second pipe sections during a fire to prevent transmission of the fire through a penetration and a floor and mounted on one end of a vertical vent body spaced apart from the floor, the air vent including: a body having opposed ends with a sidewall therebetween forming an inner passageway extending through the body and having a center portion extending across the passageway such as to partially block the passageway, the center portion having an opening into a center cavity, wherein the sidewall of the body has an opening adjacent the center portion extending through the sidewall and into the center cavity of the center portion such as to allow air to enter into the center cavity of the center portion, a cap mounted on one end of the body and having a guide pin extending inward from an inner surface of a top of the cap toward the center portion of the body, a valve plunger having a top with a hollow stem extending outward from the top wherein the hollow stem is slidingly mounted over the guide pin of the cap such that when the cap is mounted on the body, the valve plunger is mounted such that the top is adjacent the top of the cap and the hollow stem extends downward into the body, and a sealing member mounted on the plunger adjacent the top on a side opposite the top of the cap wherein when the vent is mounted on the vertical vent body, the valve plunger is in a closed position such that the sealing member is in contact with the opening of the center cavity of the center portion and seals the center cavity of the center portion to prevent air from entering the passageway of the body, wherein during a fire, positive pressure in the interior of the first and second pipe sections keeps the air vent in the closed position which prevents air from entering through the air vent into the interior of the pipe sections which prevents fire from being transmitted through the penetration and the floor.

Figure 1:
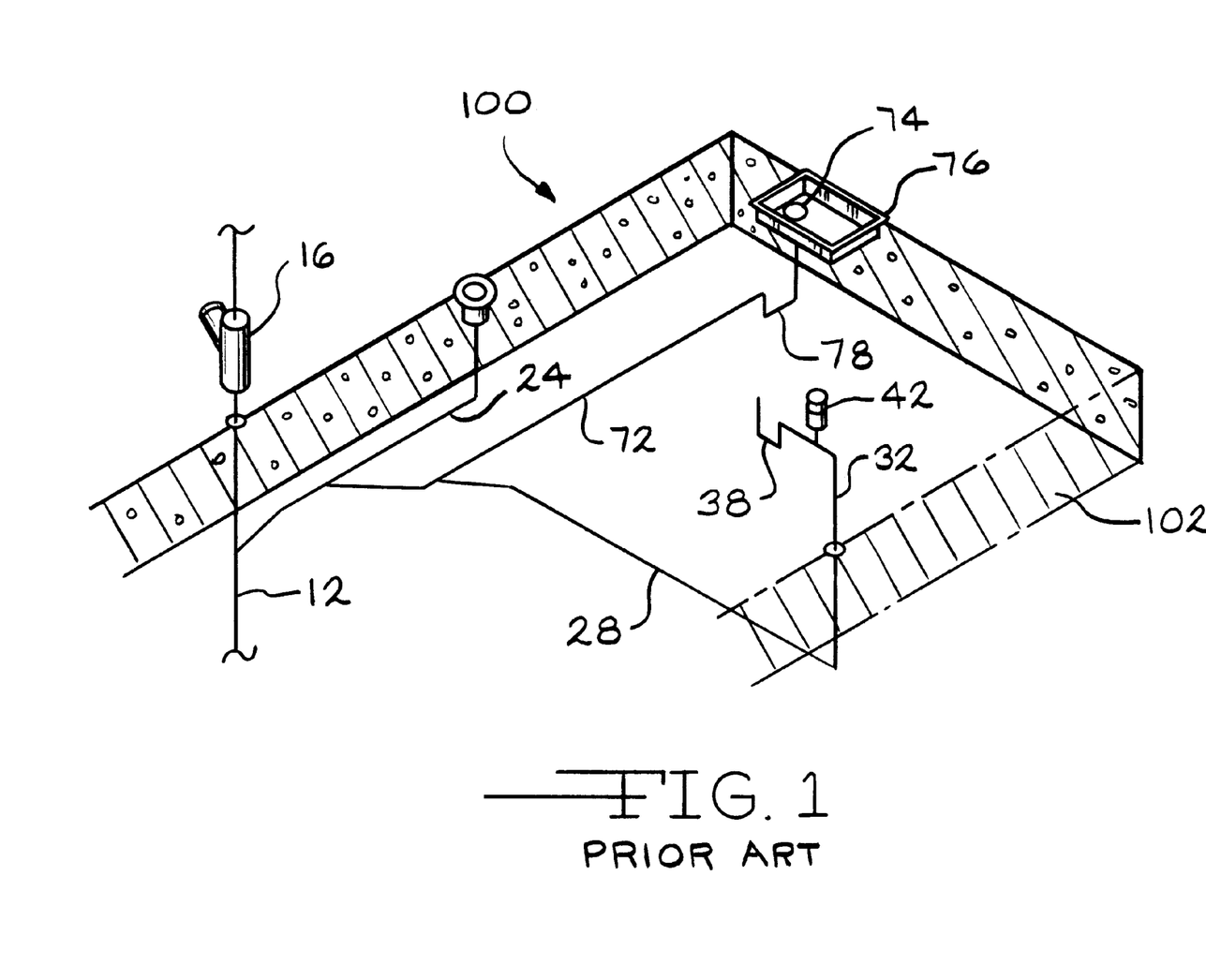
FIG. 1 is a perspective view of a drainage system 100 of the prior art having a firestop 16.
Figure 2:
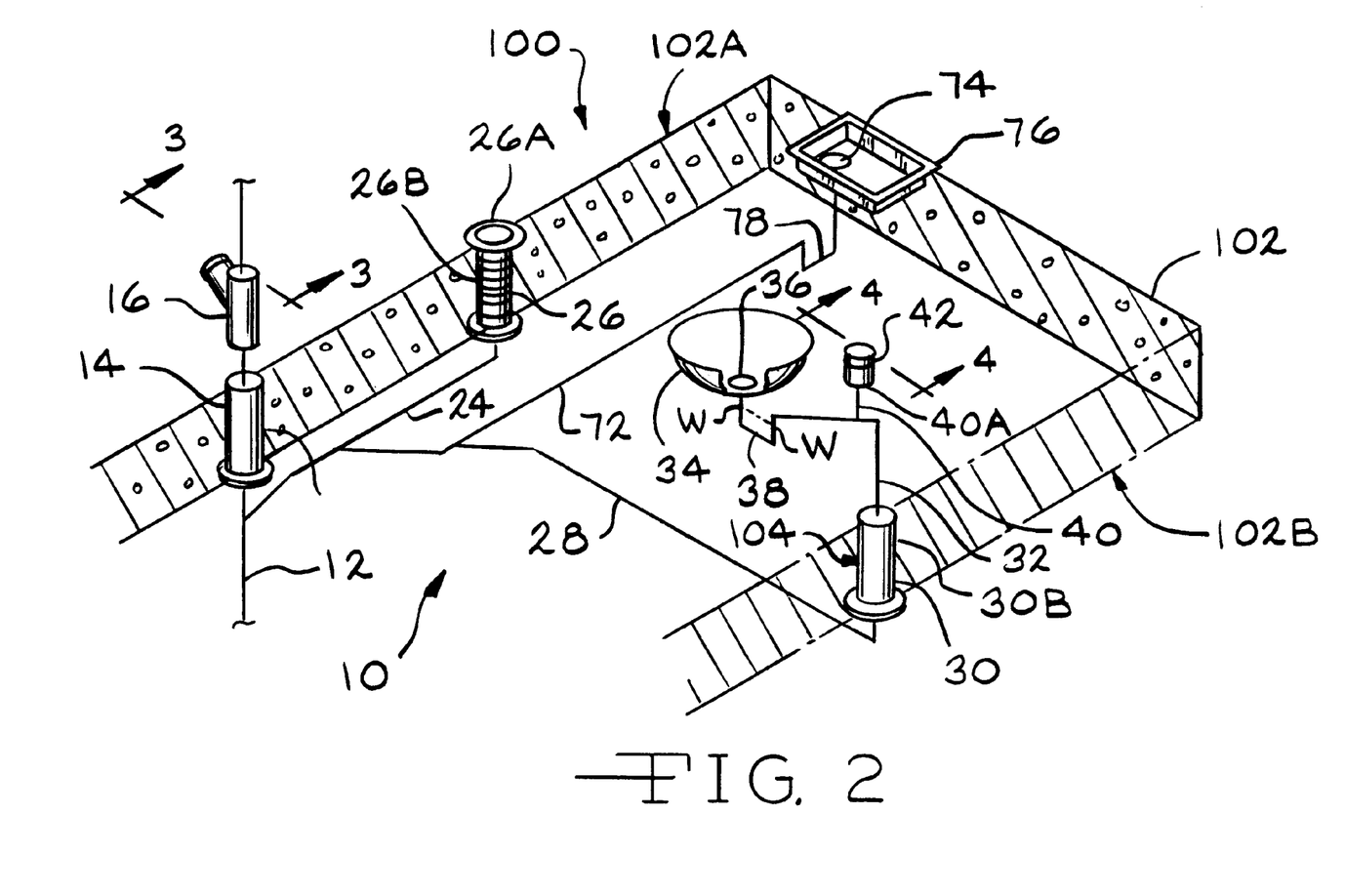
FIG. 2 is a perspective view of the fire transmission prevention system 10 of the present invention.
Figure 3:
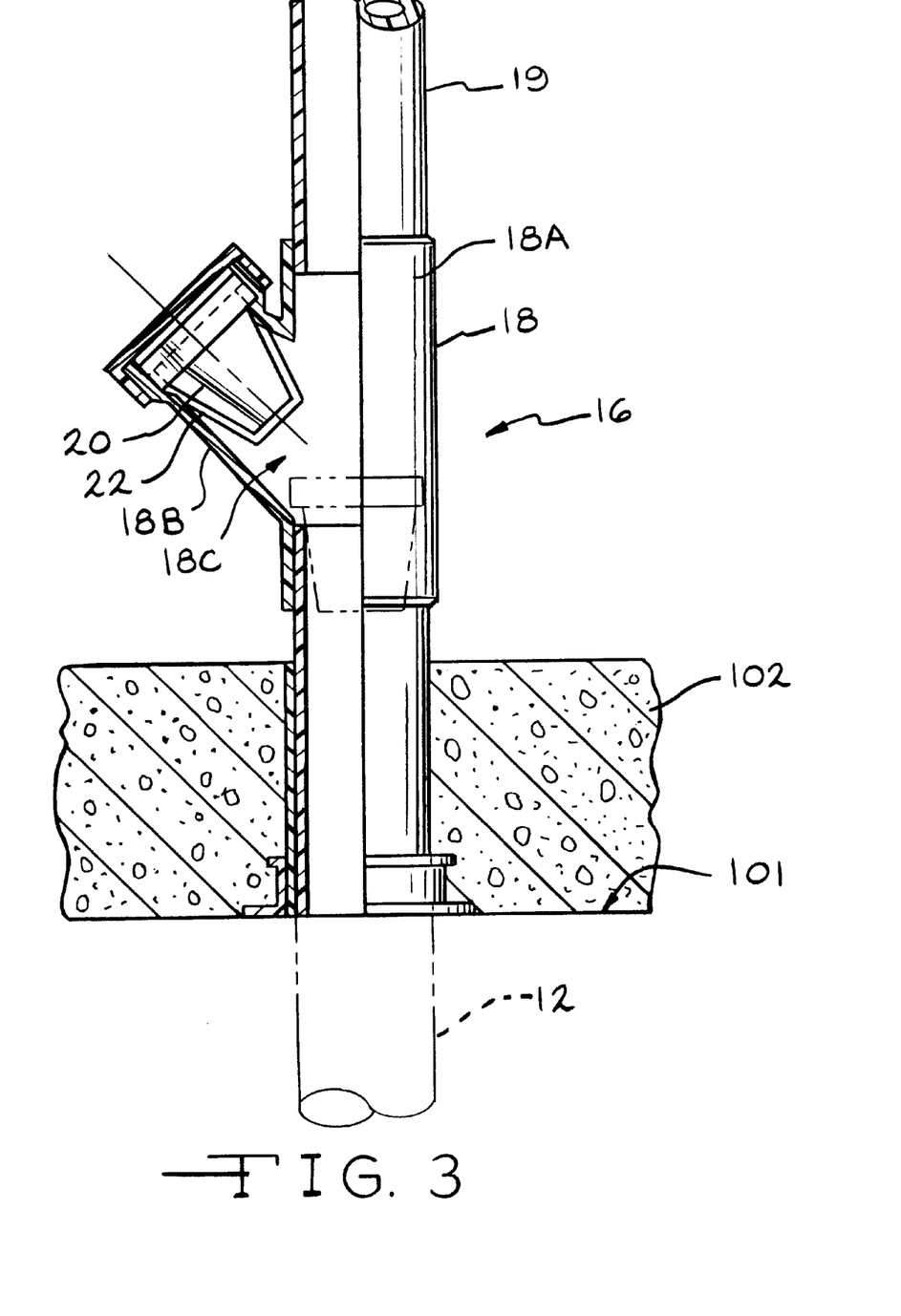
FIG. 3 is a cross-sectional view of a firestop 16 of the present invention.

FIG. 2 shows a branch drainage system 100 having the fire transmission prevention system 10 of the present invention. The fire transmission prevention system 10 is intended to be used in multi-story structures or buildings where there is a possibility that fire and smoke will move between floors 102 through the pipes 12, 24, 28 or 72 of the drainage system 100. The fire transmission prevention system 10 is preferably used in structures having concrete floors. However, the fire transmission prevention system 10 could also be used in structures having wood floors and fire rated drywall ceilings. The fire transmission prevention system 10 preferably includes a firestop 16, an air vent 42 and a fire resistant coupling 14, 26 or 30. The system 10 can be constructed of a variety of different combinations of firestops 16, air vents 42 and couplings 14, 26 and 30 depending on the particular combination of the drainage system 100 in the structure. The drainage system 100 shown in FIG. 2 has three (3) drain pipes 12, 24 and 28 which extend upward through couplings 14, 26 and 30 and through the floor 102. Preferably, the fire transmission prevention system 10 always includes a coupling 14, 26 or 30 where a pipe 12, 24 or 28 of the drainage system 100 extends through a floor 102 or wall of a structure. The first drain pipe 12 extends from the outlet pipe (not shown) of the drainage system 10 upward into and through a first coupling 14 in the floor 102 to a firestop 16 (FIG. 2). The first coupling 14 is of a type which does not allow smoke or fire to move through the floor 102 between the coupling 14 and the floor material. Any type or a variety of types of couplings 14, 26 or 30 can be used in the fire transmission prevention system 10. The type of coupling 14, 26 or 30 used would depend in part on the construction of the floor 102. The coupling 14, 26 or 30 is mounted in the floor 102 such that smoke and fire are unable to pass around the coupling 14, 26 or 30 between the outer surface 26B or 30B of the coupling 14, 26 or 30 and the floor 102. The first coupling 14 is preferably similar to any one of the couplings described in U.S. Pat. Nos. 4,261,598; 4,583,565; 4,623,170; 5,035,097; 5,040,351; 5,263,746 and 5,293,724. The first coupling 14 is preferably constructed of fire resistant resin material having a high temperature, low flame spread rating. In the preferred embodiment, the floor 102 is constructed of concrete and the first coupling 14 is secured in the concrete. In one embodiment, the first coupling 14 is secured to the deck 101 and a protective cap (not shown) is mounted on the top end of the first coupling 14. Concrete is then poured around the coupling 14 and allowed to set. In another embodiment (not shown), the first coupling 14 has concentric depressions around its outer surface and is secured to the floor 102 by pouring concrete around the outer surface of the coupling 14 (FIGS. 2 and 3). As the concrete is poured around the first coupling 14, the concrete fills the concentric depressions. When the concrete is set, the first coupling 14 is securely mounted in the floor 102 providing an airtight connection between the coupling 14 and the floor 102 such that smoke and fire are unable to move past the first coupling 14 between the first coupling 14 and the floor 102. The above type of couplings 14 are preferably used in corrugated metal or plywood decks covered by concrete.

In the preferred embodiment, the firestop 16 is located above the floor 102 and above the first coupling 14. The firestop 16 is preferably similar to the firestops described in U.S. Pat. Nos. 4,638,829; 4,724,858; 5,127,425 (horizontal) and 5,183,070 or to the Code Red Wye sold by PROSET® Systems located in Lawrenceville, Ga. In the preferred embodiment, the firestop 16 is located in a vertical drain pipe. In an alternative embodiment (not shown), the firestop 16 is located in a horizontal pipe section. In another embodiment, the firestop 16 would be similar to that described in U.S. Pat. No. 5,076,309. The firestop 16 preferably includes a wye 18 having a side pipe 18B and a main pipe 18A. The bottom portion of the main pipe 18A is mounted over one end of the drain pipe 12 which extends through the first coupling 14 mounted in the floor 102 (FIG. 3). The first drain pipe 12 is provided as a single piece which extends from the outlet pipe completely through the first coupling 14 to the firestop 16. A pipe 19 extends upward from the top of the main pipe 18A of the wye 18 to a fixture (not shown) or the remainder of the drainage system 100. The side pipe 18B preferably angles downward into the main pipe 18A. A plug 20 is mounted at the end of the side pipe 18B opposite the main pipe 18A and is held in place by a harness 22. The plug 20 has a conical lower end with an enlarged upper end such that the plug 20 fits securely in the passageway 18C of the main pipe 18A. The harness 22 is preferably constructed of a meltable material while the plug 20 is preferably constructed of a non-meltable fire resistant material such as cast iron.

Figure 8:
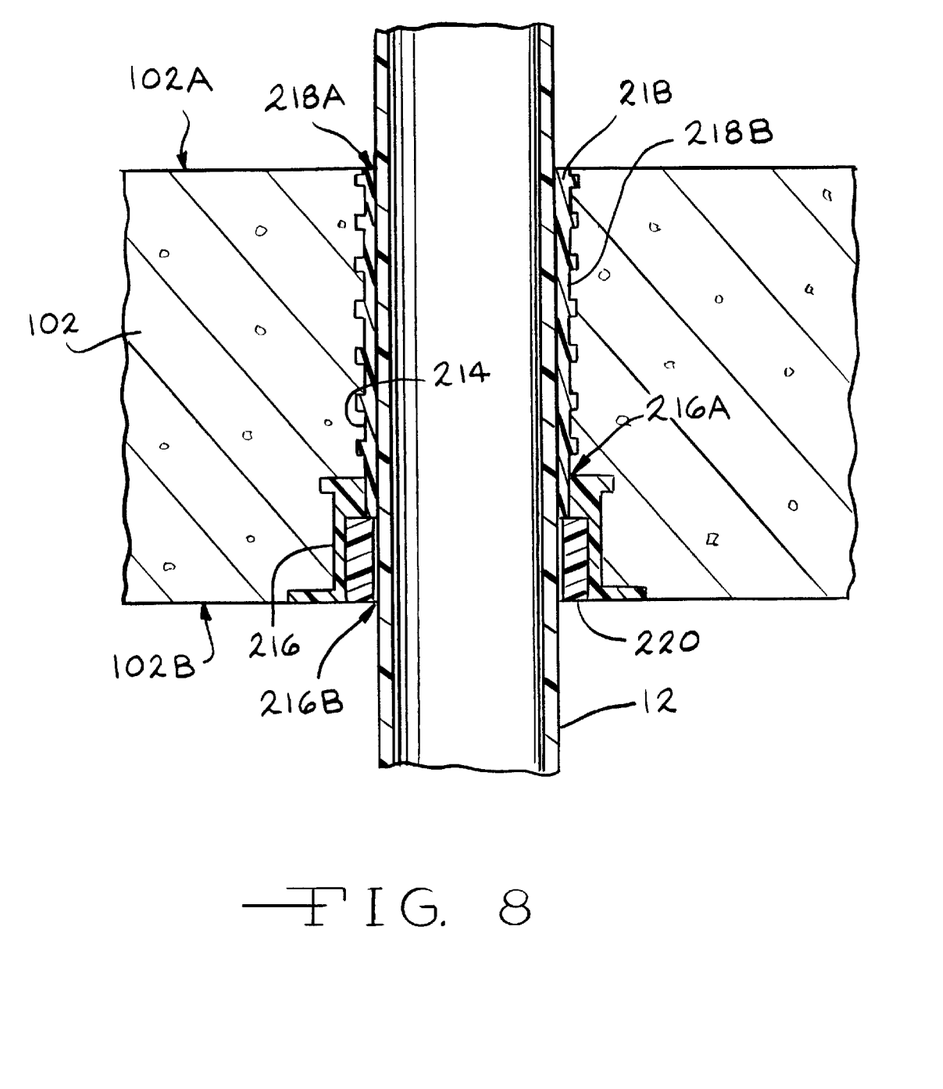
FIG. 8 is a cross-section view of a fire coupling 214 of the alternate embodiment.

In an alternative embodiment, an intumescent firestop coupling 214 can be used in place of the first coupling 14 (FIG. 8). The intumescent firestop coupling 214 of the alternative embodiment is preferably similar to the first, second or third couplings 14, 26 or 30 of the preferred embodiment in that the firestop coupling 214 is securely mounted in the floor 102, such that fire and smoke are unable to pass between the floor 102 and the coupling 214 and thus, move between floors 102. The firestop coupling 214 includes a flange portion 216 and a sleeve extension 218 that is mounted in the open top end 216A of the flange portion 216. The extension 218 is preferably solvent welded into the flange portion 216. The extension 218 can have concentric depressions 218B around its outer surface which allows for securing the coupling 214 in a concrete floor 102. The firestop coupling 214 is mounted in the floor 102 such that the open bottom end 216B of the flange portion 216 is adjacent to and flush with an underneath side 102B of the floor 102. The extension 218 extends away from the flange portion 216 such that the open top end 218A of the extension 218 is flush with a top side 102A of the floor 102. The inner diameter of the flange portion 216 adjacent the open bottom end 216B is greater than the inner diameter of the flange portion 216 adjacent the open top end 216B such as to accommodate an expansion strip 220 along the inside surface of the flange portion 216 adjacent the open bottom end 216B. In the preferred embodiment, the strip 220 has a width of approximately 1.50 inches (3.81 cm). The thickness of the strip 220 depends on the diameter of the first drain pipe 12 extending through the firestop coupling 214. In one embodiment (not shown), the strip 220 is provided in wraps with one (1) wrap used for a 2.0 inch (5.1 cm) pipe, two (2) wraps used for a 3.0 inch (7.6 cm) pipe and three (3) wraps used for a 4.0 inch (10.2 cm) pipe. In this embodiment, the wraps preferably have a thickness of 0.25 inches (0.64 cm). The strip 220 is preferably constructed of an intumescent material which expands in response to heat. The first drain pipe 12 is provided as a single piece which extends completely through the firestop coupling 214 (FIG. 8).

The second drain pipe 24 branches off from the first drain pipe 12 below the first coupling 14 and extends to a second coupling 26 in the floor 102. The second coupling 26 is preferably similar to the first coupling 14 and acts to prevent smoke and fire from moving through the floor 102 by passing around the outer surface 26B of the second coupling 26. In one (1) embodiment, the second coupling 26 is provided with an upper flange 26A to allow for mounting of a fixture such as a toilet (not shown).

The third drain pipe 28 branches off of the second drain pipe 24 and extends through a third coupling 30 in the floor 102 to a branch drainage system above the floor 102. The third coupling 30 is preferably similar to the first and second couplings 14 and 26 in that it does not allow smoke and fire to move between floors 102 by passing between the outer surface 30B of the third coupling 30 and the floor material. The third coupling 30 is preferably press fitted into a cored hole 104 in the floor 102 (FIG. 2). A bonding agent (not shown) is used to secure the third coupling 30 in the cored hole 104. The bonding agent prevents smoke and fire from moving past the third coupling 30 between the coupling 30 and the floor material. The third coupling 30 is preferably similar to the coupling described in my U.S. Pat. Nos. 5,035,097 or 5,040,351. A pipe section 32 extends from the third coupling 30 to a first drain 36 of a first fixture 34 and forms a branch drainage system. The pipe section 32 or branch drainage system preferably includes a branch trap 38 and a vent pipe 40 having an air vent 42. The branch trap 38 is preferably located directly adjacent the first fixture 34 in the pipe section 32. The vent pipe 40 is positioned between the branch trap 38 and the third coupling 30 and extends upward from the pipe section 32 away from the floor 102. In the preferred embodiment, the vent pipe 40 extends upward such that the open top end 40A of the vent pipe 40 is above a weir water level W—W of the branch trap 38. The pipe section 32, the branch trap 38 and the vent pipe 40 are preferably constructed of a heat resistant plastic material such as PVC. The air vent 42 is mounted on the end 40A of the vent pipe 40 opposite the pipe section 32. The vent pipe 40 extends upward a distance such that the air vent 42 is spaced above the weir water level W—W of all the traps 38 in the branch drainage system 100. In the preferred embodiment, the air vent 42 is spaced at least 4.0 inches (10.2 cm) above the weir water level W—W of the highest branch trap 38 in the branch drainage system 100.

Figure 4:
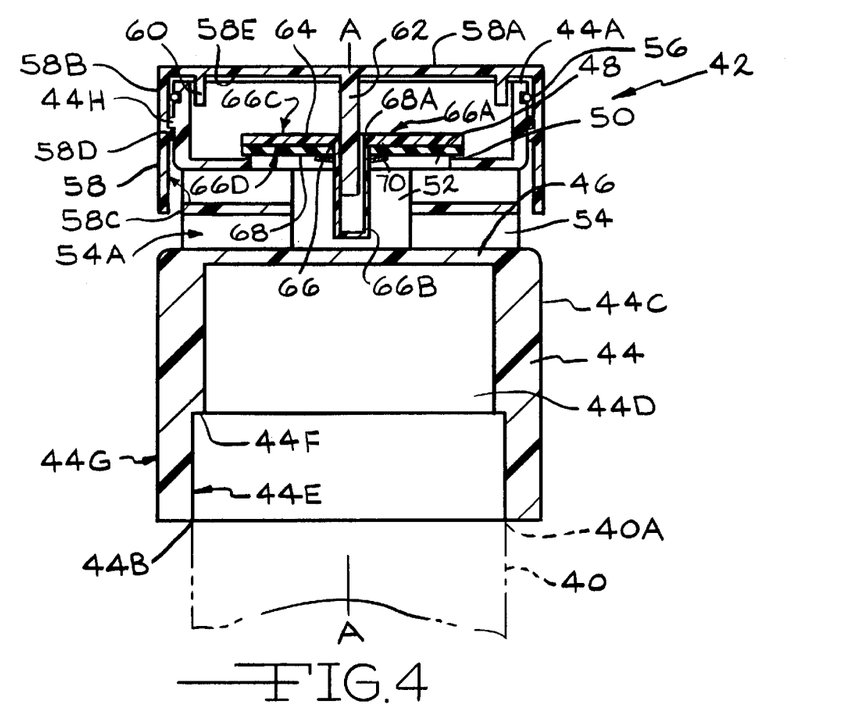
FIG. 4 is a cross-sectional view of the air vent 42 of the present invention in the closed position.
Figure 5:
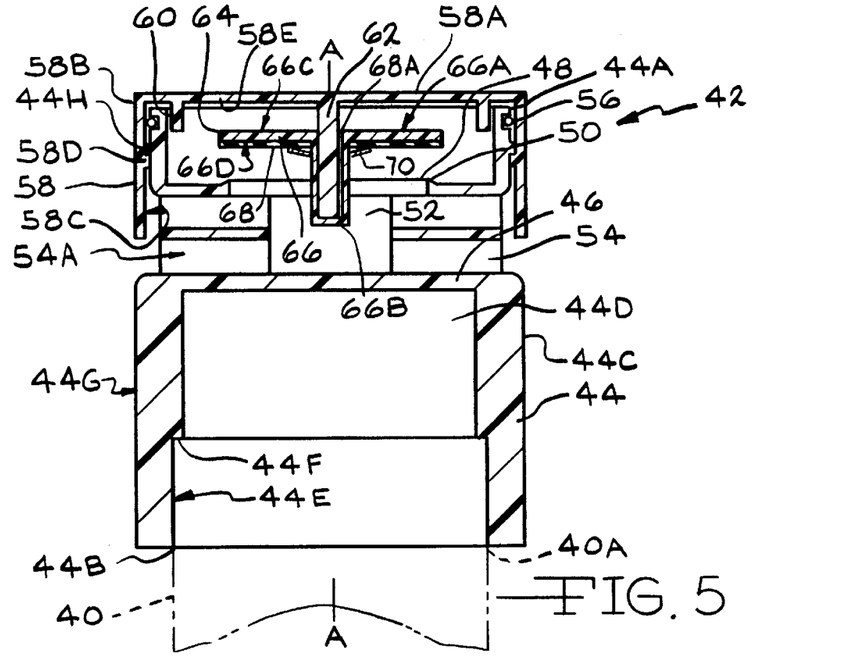
FIG. 5 is a cross-sectional view of the air vent 42 of the present invention in the open position.

FIGS. 4 and 5 show the air vent 42 of the preferred embodiment. However, the air vent 42 can be similar to any air admittance valve known in the art. In the preferred embodiment, the air vent 42 includes a body 44 having a center portion 46, a cap 58 and a valve member 64. The body 44 preferably has a tubular, cylindrical shape with an open top end 44A and an open bottom end 44B with a sidewall 44C extending therebetween forming an inner passageway 44D. The open bottom end 44B is adapted for mounting over the open top end 40A of the vent pipe 40. In the preferred embodiment, the open bottom end 44B has an inner and outer diameter of a size such as to accommodate a variety of different diameter vent pipes 40 either by mounting over the open top end 40A of the vent pipe 40 or by extending into the open top end 40A of the vent pipe 40. The body 44 of the vent 40 adjacent the bottom end 44B has a combination size of 1.5 inches (3.8 cm) within the inside passageway 44D and 2.0 inches (5.1 cm) around the outside surface 44G of the body 44 so that the air vent 42 can be mounted over the top end of pipes having a 1.5 inch diameter and extend into the top end of pipes having a 2.0 inch diameter. The inner surface 44E of the sidewall 44C of the body 44 adjacent the bottom end 44B is also preferably provided with a step 44F which further allows the air vent 42 to be mounted on vent pipes 40 having different diameters.

Figure 6:
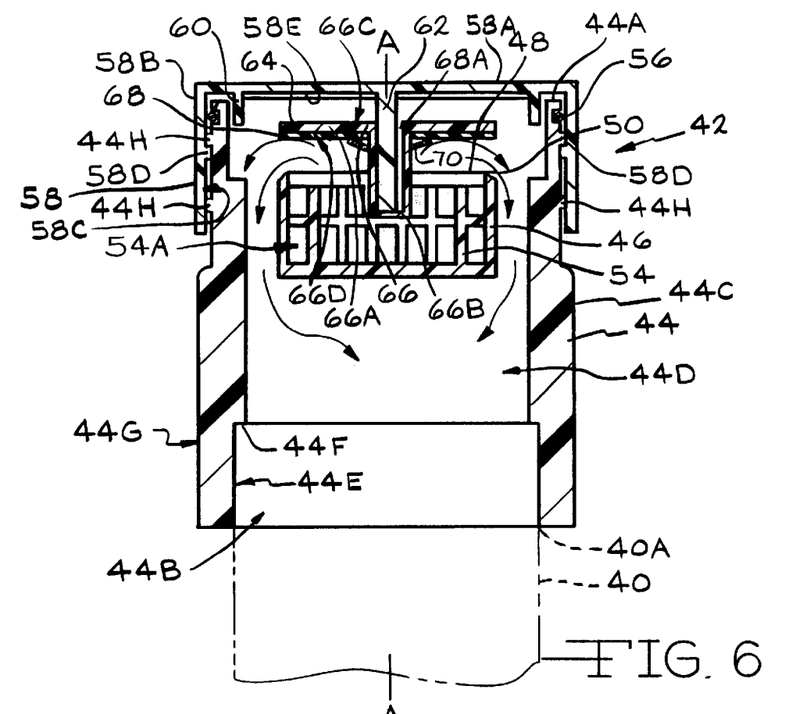
FIG. 6 is a cross-sectional view of the air vent 42 in the open position showing the flow of ambient air into the vent pipe 40.
Figure 7:
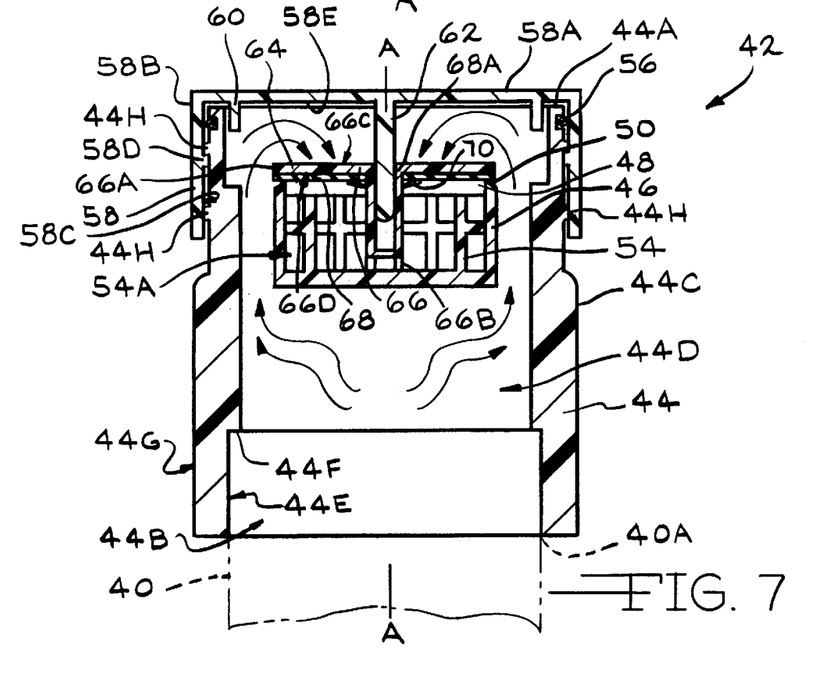
FIG. 7 is a cross-sectional view of the air vent 42 in the closed position preventing the flow of inside air out of the vent pipe 40.

The inner passageway 44D of the body 44 has a center portion 46 which extends completely across the inner passageway 44D between the open ends 44A of the body 44 such that the ends of the center portion 46 extend into and are part of the sidewall 44C of the body 44. In the preferred embodiment, the center portion 46 is spaced closer to the open top end 44A of the body 44 such as to allow the open bottom end 44B of the body 44 to be securely mounted on the vent pipe 40. The center portion 46 has a width such as to only block a portion of the inner passageway 44D such that air is able to pass around the center portion 46 between the ends 44A and 44B of the body 44. The outer diameter of the body 44 adjacent the top end 44A and including the portion of the body 44 having the center portion 46, has an outer diameter smaller than the outer diameter of the remainder of the body 44 adjacent the bottom end 44B. This allows the bottom end 44B to be mounted in the vent pipe 40 without the possibility of the body 44 being inserted into the vent pipe 40 such a distance as to cover the air inlets 54 (to be described in detail hereinafter). The center portion 46 preferably has a center opening 48 on the side adjacent the open top end 44A of the body 44. The center opening 48 is preferably circular and has a raised lip 50 around the circumference of the center opening 48. The center opening 48 extends into and allows access to a center cavity 52 in the center portion 46. The sidewall 44C of the body 44 has air inlets 54 adjacent each end of the center portion 46. The air inlets 54 extend completely through the sidewall 44C and through the ends of the center portion 46 into the center cavity 52 and allow fluid communication between the outside ambient air and the center cavity 52. The air inlets 54 preferably extend perpendicular to the longitudinal axis of the vent (FIGS. 6 and 7). In the preferred embodiment, each air inlet 54 is divided into a series of smaller apertures 54A. The outer surface 44G of the sidewall 44C at the air inlets 54 is preferably indented such that the sidewall 44C of the body 44 above and below the air inlets 54 extends outward beyond the outside edge of the air inlets 54. The outer surface 44G of the sidewall 44C adjacent and above the air inlets 54 is provided with concentric ribs 44H. In the preferred embodiment, there are two (2) ribs 44H. The outer surface 44G of the sidewall 44C adjacent the top end 44A is also provided with a seal 56 which extends outward beyond the outer surface 44G of the body 44. The seal 56 is preferably constructed of 70 durometer rubber.

The cap 58 is mounted over the open top end 44A of the body 44. The cap 58 preferably has a cylindrical shape with a closed top end 58A. In the preferred embodiment, the cap 58 has an outer diameter greater than the outer diameter of the body 44 at the open top end 44A and approximately equal to the outer diameter of the body 44 adjacent the bottom end 44B. The inner surface 58C of the sidewall 58B of the cap 58 is provided with a rib 58D. When the cap 58 is mounted over the open top end 44A of the body 44, the rib 44H is moved over and past the pair of ribs 44H on the outer surface 44G of the sidewall 44C of the body 44 which helps to hold the cap 58 in place on the open top end 44A of the body 44. The inner surface 58E of the closed top end 58A of the cap 58 is also provided with an inner flange 60 which extends downward from the cap 58 parallel to and spaced apart from the sidewall 58B of the cap 58. The flange 60 preferably extends completely around the sidewall 58B of the cap 58. The flange 60 is spaced apart from the sidewall 58B of the cap 58 such that the sidewall 44C of the body 44 with the seal 56 is friction fit between the sidewall 58B of the cap 58 and the flange 60 such as to sealingly mount the cap 58 on the open top end 44A of the body 44 such that ambient air can not enter the open top end 44A of the body 44. The inner surface 58E of the closed top end 58A of the cap 58 is also provided with a guide pin 62 which extends downward from the cap 58 toward the center opening 48 of the center portion 46 of the body 44. The guide pin 62 is positioned such that when the cap 58 is correctly mounted on the open top end 44A of the body 44, the guide pin 62 is aligned with the longitudinal axis A—A of the body 44 (FIGS. 4 to 7).

The valve member 64 is mounted on the guide pin 62 of the cap 58. The valve member 64 includes a valve plunger 66 having a top 66A with a hollow stem 66B which extends outward from the bottom side 66D of the top 66A in the center of the top 66A. The shape of the top 66A of the valve member 64 is preferably approximately identical to the shape of the center opening 48 of the center portion 46. In the preferred embodiment, the top 66A has a circular shape. The top 66A preferably has an outer diameter greater than the diameter of the center opening 48 of the center portion 46. However, preferably the top 66A is of such a diameter as to not extend beyond the center portion 46 and thus, not interfere with the flow of air around the center portion 46. The valve plunger 66 is mounted on the cap 58 such that the top side 66C of the top 66A is adjacent the inner surface 58C of the closed top end 58A of the cap 58 and the guide pin 62 of the cap 58 extends into the hollow stem 66B of the valve plunger 66. A sealing member 68 is mounted on the bottom side 66D of the top 66A of the valve plunger 66 and has a center hole 68A for mounting over the hollow stem 66B of the valve plunger 66. In the preferred embodiment, the outer diameter of the sealing member 68 is approximately equal to the outer diameter of the top 66A of the valve plunger 66. The sealing member 68 is preferably constructed of 50 durometer rubber. When the valve member 64 is mounted on the cap 58 and the cap 58 is correctly mounted on the open top end 44A of the body 44 of the air vent 42, the guide pin 62 of the cap 58 and hollow stem 66B of the valve plunger 66 are preferably aligned with the longitudinal axis A—A of the body 44 and the sealing member 68 and the top 66A of the valve plunger 66 cover the center opening 48 of the center portion 46. A retainer lock washer 70 is provided around the hollow stem 66B of the valve plunger 66 to secure the sealing member 68 adjacent the bottom side 66D of the top 66A.

In the preferred embodiment, the air vent 42 weighs at least twice as much as a standard air vent 42. The air vent 42 preferably can operate at temperatures between about minus 40° and 150° degrees Fahrenheit. The air vent 42 can pass the required volume of air necessary to prevent pneumatic pressure fluctuations within plumbing code design limitations of minus 1.0 inch (2.54 cm) of water column. In the preferred embodiment, the air vent 42 is constructed of non-metallic parts except for the lock washer 70 which is preferably constructed from a series 300 stainless steel.

A fourth drain pipe 72 branches off of the third drain pipe 28 and leads directly to a second drain 74 of a second fixture 76 having a trap 78 located below the floor 102. All drain pipes 12, 24, 28 and 72 lead to a main drain pipe (not shown) which leads to the drain outlet or outlet pipe (not shown).

IN USE

The fire transmission prevention system 10 is intended to be used in a plumbing drainage system 100 having drain pipes 12, 24, 28 and 72 passing through floors 102 and walls. The fire transmission prevention system 10 prevents the transmission of fire between walls and floors 102 of a structure through the inside of the pipes 12, 24, 28 and 72 and also around the outside of the couplings 14, 26 and 30 in the drainage system 100.

Each element of the fire transmission prevention system 10 acts independently and together to prevent the transmission of smoke and fire in a structure by means of the drainage system 100. The firestop 16 acts to prevent fire transmission inside the pipes 12, 24, 28 and 72 either between floors 102 or through walls (not shown). When fire and high temperatures reach the harness 22 holding the plug 20 within the side pipe 18B of the wye 18, the harness 22 melts away and allows the plug 20 to be released into the main pipe 18A of the wye 18. The plug 20 is mounted such that when the plug 20 is released, the plug 20 moves down the secondary pipe 18B into the main pipe 18A and plugs the passageway 18C of the main pipe 18A. In this preferred embodiment, the wye 18 of the firestop 16 is located directly adjacent the coupling 14 such that the plug 20 blocks the passageway 18C of the main pipe 18A at the first coupling 14 and prevents fire and smoke from being transmitted through the inside of the wye 18. In the alternative embodiment, the strip 220 of the intumescent firestop coupling 214 expands and crushes the first drain pipe 12 extending through the coupling 214 which blocks the inner passageway of the first drain pipe 12. In this embodiment, the firestop 16 and coupling 14, 24 or 30 are combined together as a single device.

The first, second and third couplings 14, 26 and 30 also assist in preventing the spread of fires and smoke between floors 102 by preventing fire and smoke transmission around the outside of the couplings 14, 26 or 30. Similar to the firestop 16, the air vent 42 also acts to prevent smoke and fire transmission through the interior of the pipes 12, 24, 28 and 72 of the drainage system 100. When the fire and high temperatures travel up the interior of the pipes 12, 24, 28 and 72, a positive pressure is created within the pipes 12, 24, 28 and 72. The air vent 42 will automatically close off with this positive pressure. This will prevent ambient air and thus, oxygen from entering the pipes 12, 24, 28 and 72 and will prevent any fire transmission through the inside of the pipes 12, 24, 28 and 72. The air vent 42 will open and allow ambient air into the drainage system 100 with any slight negative pressure in the inside of the pipes 12, 24, 28 and 72 preventing any possible water siphonage of traps 38 or 78. The air vent 42 will close with any slight positive pressure within the drainage system 100, preventing any fowl air from escaping through the air vent 42. When the air vent 42 is mounted on the vent pipe 40, gravity acts to move the valve member 64 down the guide pin 62 of the cap 58 such that the sealing member 68 is in contact with and completely covering the center opening 48 of the center portion 46. In the usual condition, the initial pressure in the drainage system 100 is at atmospheric pressure or alternatively, will have a pressure slightly greater than atmospheric pressure. The positive or atmospheric pressure in the inner passageway 44D of the body 44 of the air vent 42 moves past the center portion 46 and pushes down on the top side 66C of the top 66A of the valve plunger 66 which increases the sealing effect of the sealing member 68 over the center opening 48 of the center portion 46. The sealing member 68 and bottom side 66D of the top 66A are exposed to the atmospheric pressure outside of the air vent 42 and drainage system 100 through the air inlets 54 in the sidewall 44C of the body 44. If the drainage system 100 has an initial positive pressure then the pressure pushing the valve member 64 downward is greater than the atmospheric pressure pushing the valve member 64 upward thus, the valve member 64 remains firmly and sealingly mounted over the center opening 48 of the center portion 46 (FIG. 7). If the initial pressure of the drain system 100 is equal to the atmospheric pressure, gravity acts to keep the valve member 64 in place over the center opening 48. If the pressure inside the drain pipes 12, 24, 28 and 72 is less then atmospheric pressure (negative pressure) then the atmospheric pressure pushing upward on the bottom side 66D of the valve plunger 66 and tending to open the vent 40 would overcome the internal pressure of the drainage pipes and the vent 40 would open (FIG. 6). Once the vent 40 is open, air enters through the air inlets 54 into the center cavity 52 and through the center opening 48 into the interior of the drain pipes 12, 24, 28 and 72. The air vent 42 serves the same purpose as a vent stack. Thus, the air vent 42 prevents the build up of a vacuum or negative pressure in the pipes 12, 24, 28 and 72 which could siphon the water from the traps 38 or 78 and allow sewer gases to escape through the adjacent fixtures 36 or 76. However, the standard vent stack has an open end which remains open at all times regardless of the presence of positive pressure in the inner passageway of the pipes 12, 24, 28 and 72. Thus, a standard vent stack in no way prevents the spread of smoke and fire through the interior of the pipes 12, 24, 28 and 72 in a drainage system 100.

In an alternative embodiment (not shown), the air vent can be positioned at the top of a standard vent stack. Thus, the air vent would act to prevent ambient air and oxygen into the inner passageway of the pipes and thus, would prevent the spread of smoke and fire.

The fire transmission prevention system 10 passes the ASTM E-814 and Canadian S115 fire test and has a two (2) hour F & T rating when passing through a minimum 4.5 inches (11.4 cm) floor 102 or when passing through a two (2) hour design fire rated floor/ceiling assembly.

It is intended that the foregoing description be only illustrative of the present invention and that the present invention be limited only by the hereinafter appended claims.

I claim:

1. In a drainage system for a structure with a penetration through a floor, wherein the system prevents transmission of a fire and smoke through and above the floor, the improvement which comprises:
   (a) a coupling having opposed ends and mounted through the penetration in the floor and secured to the floor to provide an airtight connection between the floor and the coupling;
   (b) a first pipe section mounted in one of the ends of the coupling adjacent an underside of the floor and connected to an outlet pipe for the drainage system;
   (c) a second pipe section mounted in the other one of the ends of the coupling adjacent a top side of the floor connected to a drain of a fixture, and having a first branch pipe trap between the coupling and the fixture for holding water, wherein the first branch pipe trap is at an elevation above all other branch pipe traps connected to the second pipe section; and
   (d) an air vent mounted at a high point of the second pipe section between the coupling and the first branch pipe trap and mounted at least four inches above a weir water level of the first branch pipe trap, wherein the air vent opens and allows air into the drainage system when a negative pressure relative to atmospheric pressure is present in the system and automatically closes when there is a positive pressure relative to atmospheric pressure present in the system and wherein the system prevents fire transmission through the penetration and floor by automatic closing of the air vent.

2. The system of claim 1 wherein the floor is constructed of concrete and wherein the coupling has concentric depressions secured to the concrete floor by pouring concrete around the coupling such that the concentric depressions are filled with the concrete and allowing the concrete to set.

3. The system of claim 1 wherein the floor is constructed of concrete, wherein the coupling has been press fitted into a cored hole in the concrete floor and wherein a bonding agent secures the coupling to the floor.

4. The system of claim 1 wherein the coupling is constructed of a fire resistant resin material and the first and second pipe sections are constructed of plastic materials.

5. The system of any one of claims 1, 2, 3 or 4 wherein the air vent comprises a body mounted on the second pipe section with an opening to the atmosphere and mounting a valve member which seals the opening in the body when a positive pressure relative to atmospheric pressure is present inside the body and opens the opening in the body when a negative pressure is present inside the body.

6. The system of any one of claims 1, 2, 3 or 4 wherein the air vent comprises a body mounted on the second pipe section with an opening to the atmosphere and mounting a free moving valve member which seals the opening in the body when a positive pressure relative to the atmospheric pressure is present inside of the body and unseals the opening in the body when a negative pressure is present inside the body.

7. The system of any one of claims 1, 2, 3 or 4 wherein the air vent includes: i.) a body having opposed ends with a sidewall therebetween forming an inner passageway extending through the body and having a center portion extending across the passageway such as to partially block the passageway, the center portion having an opening into a center cavity, wherein the sidewall of the body has an opening adjacent the center portion extending through the sidewall and into the center cavity of the center portion such as to allow air to enter into the center cavity of the center portion, ii.) a cap mounted on one end of the body and having a guide pin extending inward from an inner surface of a top of the cap toward the center portion of the body, iii.) a valve plunger having a top with a hollow stem extending outward from the top wherein the hollow stem is slidingly mounted over the guide pin of the cap such that when the cap is mounted on the body, the valve plunger is mounted such that the top is adjacent the top of the cap and the hollow stem extends downward into the body, and iv.) a sealing member mounted on the plunger adjacent the top on a side opposite the top of the cap wherein when the air vent is mounted on the second pipe section, the valve plunger is in a closed position such that the sealing member is in contact with the opening of the center cavity of the center portion and seals the center cavity of the center portion to prevent air from entering the inner passageway of the body, wherein during a fire, positive pressure in an interior of the first and second pipe sections keeps the air vent in the closed position which prevents air from entering through the air vent into the interior of the pipe sections.

8. The system of claim 1 wherein a third pipe section is connected to the first pipe section and extends upward through the floor, wherein a firestop is mounted on the third pipe section and acts to close an inner passageway of the third pipe section to prevent the transmission of smoke and fire through the inner passageway of the third pipe section.

9. The system of claim 8 wherein the firestop is mounted in the third pipe section above a top side of the floor and wherein the firestop has a wye portion with a side pipe and a main pipe with a heat resistant plug held in an end of the side pipe opposite the main pipe by a harness which melts in response to heat such that when heat from the fire contacts the firestop, the harness melts releasing the plug and the plug moves down the side pipe and into the main pipe to block the inner passageway of the third pipe section.

10. The system of claim 8 wherein the firestop is a firestop coupling mounted in the floor with the third pipe section extending through the firestop coupling and when the firestop coupling has a heat expandable strip on an inner surface which expands in response to heat from the fire and crushes the third pipe section which closes the inner passageway of the third pipe section.

11. The system of claim 1 wherein the floor is constructed of concrete.

12. A method for providing a drainage system in a structure with a penetration through a floor wherein the system prevents transmission of a fire and smoke through and above the floor, which comprises the steps of:
   (a) mounting a coupling through the floor to provide an airtight connection between the coupling and the floor;
   (b) mounting first and second pipe sections each having opposed ends in the coupling, wherein the first pipe section is mounted at one end in the coupling adjacent an underside of the floor and is connected at the other end to an outlet pipe for the drainage system and the second pipe section is mounted in the coupling adjacent a top side of the floor and is connected at the other end to a drain of a fixture, the second pipe section having a first branch pipe trap between the coupling and the fixture for holding water wherein the first branch pipe trap is at an elevation above all other branch pipe traps connected to the second pipe section; and
   (c) mounting an air vent at a high point in the second pipe section at least four inches above a weir water level of the first branch pipe trap, wherein the air vent allows air into the system when a negative pressure relative to atmospheric pressure is present in the system and automatically closes when there is a positive pressure relative to atmospheric pressure in the system and wherein the system prevents transmission of the fire through the penetration and floor by closing the air vent.

13. The method of claim 12 wherein the coupling is secured to the floor by concrete which is poured and set around the coupling.

14. The method of claim 12 wherein the coupling is secured to the floor by being press fitted into a cored hole in the floor and wherein a bonding agent is used to secure the coupling to the floor.

15. The method of claim 12 wherein the coupling is constructed of a fire resistant resin material and the first and second pipe sections are constructed of plastic materials.

16. The method of any one of claims 12, 13, or 14 wherein the air vent comprises a conduit mounted on the second pipe section with an opening to the atmosphere and mounting a valve member which seals the opening in the conduit when a positive pressure relative to atmospheric pressure is present inside the conduit and opens the opening in the conduit when a negative pressure is present inside the conduit.

17. The method of any one of claims 12, 13, or 14 wherein the air vent comprises a body mounted on the second pipe section with an opening to the atmosphere and mounting a free moving valve member which seals the opening in the body when a positive pressure relative to atmospheric pressure is present inside of the body and opens the opening in the body when a negative pressure is present inside the body.

18. The method of any one of claims 12, 13, or 14 wherein the air vent includes: i.) a body having opposed ends with a sidewall therebetween forming an inner passageway extending through the body and having a center portion extending across the passageway such as to partially block the passageway, the center portion having an opening into a center cavity, wherein the sidewall of the body has an opening adjacent the center portion extending through the sidewall and into the center cavity of the center portion such as to allow sufficient air to enter into the center cavity of the center portion, ii.) a cap mounted on one end of the body and having a guide pin extending inward from an inner surface of a top of the cap toward the center portion of the body, iii.) a valve plunger having a top with a hollow stem extending outward from the top wherein the hollow stem is slidingly mounted over the guide pin of the cap such that when the cap is mounted on the body, the valve plunger is mounted such that the top is adjacent the top of the cap and the hollow stem extends downward into the body, and iv.) a sealing member mounted on the plunger adjacent the top on a side opposite the top of the cap wherein when the air vent is mounted on the second pipe section, the valve plunger is in a closed position such that the sealing member is in contact with the opening of the center cavity of the center portion and seals the center cavity of the center portion to prevent air from entering the passageway of the body, wherein during a fire, positive pressure in an interior of the first and second pipe sections keeps the valve means in the closed position which prevents air from entering through the air vent into the interior of the pipe sections.

19. The method of claim 12 including the steps of mounting a third pipe section through the floor and connected to the first pipe section and extending through the floor and mounting a firestop on the third pipe section wherein during a fire, the firestop acts to close an inner passageway of the third pipe section to prevent the transmission of smoke and fire through the inner passageway of the third pipe section.

20. An air vent for preventing air from entering an interior of first and second pipe sections during a fire to prevent transmission of the fire through a penetration and a floor and mounted on one end of a vertical vent body spaced apart from the floor, the air vent including:
   a) a body having opposed ends with a sidewall therebetween forming an inner passageway extending through the body and having a center portion extending across the passageway such as to partially block the passageway, the center portion having an opening into a center cavity, wherein the sidewall of the body has an opening adjacent the center portion extending through the sidewall and into the center cavity of the center portion such as to allow air to enter into the center cavity of the center portion,
   b) a cap mounted on one end of the body and having a guide pin extending inward from an inner surface of a top of the cap toward the center portion of the body,
   c) a valve plunger having a top with a hollow stem extending outward from the top wherein the hollow stem is slidingly mounted over the guide pin of the cap such that when the cap is mounted on the body, the valve plunger is mounted such that the top is adjacent the top of the cap and the hollow stem extends downward into the body, and
   d) a sealing member mounted on the plunger adjacent the top on a side opposite the top of the cap wherein when the vent is mounted on the vertical vent body, the valve plunger is in a closed position such that the sealing member is in contact with the opening of the center cavity of the center portion and seals the center cavity of the center portion to prevent air from entering the passageway of the body, wherein during a fire, positive pressure in the interior of the first and second pipe sections keeps the air vent in the closed position which prevents air from entering through the air vent into the interior of the pipe sections which prevents fire from being transmitted through the penetration and the floor.

21. The air vent valve of claim 20 wherein the body has a stepped portion for connection to vertical vent bodies having different diameters.

22. The air vent valve of claim 21 wherein the body, valve plunger, cap and sealing member are comprised of a plastic material.

* * * * *

UNITED STATES PATENT AND TRADEMARK OFFICE
CERTIFICATE OF CORRECTION

PATENT NO.    : 6,161,564
DATED         : December 19, 2000
INVENTOR(S)   : Kenneth R. Cornwall It is certified that error appears in the above-identified patent and that said Letters Patent is hereby corrected as shown below:

Column 14,
Line 53 (Claim 22), "of Claim 21" should be -- of Claim 20 --.

Signed and Sealed this

Twenty-third Day of October, 2001

Attest:

*Nicholas P. Godici*

NICHOLAS P. GODICI
*Attesting Officer*        *Acting Director of the United States Patent and Trademark Office*